Patented Feb. 24, 1942

2,274,067

UNITED STATES PATENT OFFICE 2,274,067

SPARK PLUG INSULATOR

Joseph A. Jeffery, Detroit, Mich., assignor, by mesne assignments, to Champion Spark Plug Company, Toledo, Ohio, a corporation of Delaware (1938)

No Drawing. Application May 27, 1938, Serial No. 210,466

4 Claims. (Cl. 106—46)

This invention relates to insulating material and a method of making the same, the material being especially suitable for spark plug insulators and uses requiring similar qualities.

A satisfactory spark plug insulator must retain its insulating quality at high temperatures, must be resistant to heat shock in view of the violent temperature changes to which it is subjected, must have sufficient heat conductivity to prevent the portion within the firing chamber from becoming so hot as to cause pre-firing, must have high mechanical strength and should have high thermal-expansion relative to ordinary ceramic material, since it is customarily employed in conjunction with metal parts having coefficients of thermal-expansion higher than ordinary ceramic materials.

A properly made product consisting substantially of recrystallized alumina combines these various requirements to a very great extent. There are other materials which have some of these desirable characteristics to an even higher degree than alumina, but these other materials accompany their good qualities with others which are not so desirable. It has been difficult to produce a properly formed alumina insulating body at a price making it competitive for spark plug purposes. One of the principal difficulties has been the high temperature required for properly firing an alumina body.

It is, of course, well known that the firing temperature of ceramic materials can be lowered by various fluxes, but the addition of the ordinary fluxes to alumina for the purpose of lowering the firing temperature results deleteriously upon the desirable characteristics of the finished product. Some fluxes are injurious because of deleterious effect upon one desirable quality of the resulting product and others because of deleterious effects upon other qualities of the product.

It has been found that substantially pure alkaline earth fluxes, such as magnesia or whiting, produce a marked reduction in the firing temperature of an alumina body without detracting from the good qualities of the resultant insulating material. In fact, when used in proper small quantities, the addition of these materials renders the proper recrystallization of the alumina much more reliable, so that in fact the resultant product is improved from a practical standpoint. Of course, it is readily understood that, to be satisfactory in use, material must be sufficiently uniform so that the poorer portions thereof are still up to standard in use; otherwise the product cannot be made commercially satisfactory even though individual examples of very satisfactory insulators could be made.

Whiting is a very readily obtainable calcium compound which can be added to purified alumina grains to reduce the firing temperature. Other sources of calcium oxide or other calcium compounds, free from alkali or other deleterious ingredients, may be employed if more convenient, as will be readily understood, but, for convenience, the addition of whiting will be discussed as generic to such compounds. The addition of 2% of whiting has a material effect upon lowering the firing temperature of alumina and assists in the recrystallization and insures a more uniform product. Further reduction in firing temperatures and improvements in some respects result from increased addition of whiting up to 10%, but these larger amounts of whiting accelerate the crystallization to such an extent that the product may not have the desired fine-grained structure. It is preferable, therefore, to employ about 2% of whiting and not over 5% thereof, although under some circumstances, as indicated, up to 10% may be employed.

Compounds of magnesium likewise lower the firing temperature of alumina without deleterious results, when used in small amounts. It appears to be feasible to use larger amounts of compounds of magnesium than of compounds of calcium without affecting the qualities of the spark plug, but excessive amounts of compounds of magnesium reduce the mechanical strength, and still more the resistance to heat shock.

It has been found that the use of compounds of magnesium and compounds of calcium together, in proper proportions, reduces the firing temperature more than the equal amount of either of the compounds alone, and at the same time provides a safety factor against the lowering of the hot dielectric due to incidental impurities.

The ordinary commercial alumina always contains at least traces of sodium compounds. Even small amounts of these compounds lower the hot dielectric seriously. It is found that the employment of compounds of calcium and magnesium in small amounts sufficient to lower the firing temperature appreciably, at the same time raise the hot dielectric even of the most nearly pure alumina commercially available, and that it very markedly raises the hot dielectric of the less pure alumina. For example, the use of 2% of talc and 1½% of whiting has been found to raise the hot dielectric values of alumina containing about $\frac{1}{10}$ of 1% $Na_2O$ 300° or 400° F.

2% of brucite with 2% of whiting has a similar effect. 8% of dolomite raises the hot dielectric even more.

The method of preparation of the material has an important bearing upon the maturing temperature and also upon the uniformity of the resultant product. It will be readily understood that for satisfactory results in producing spark plug cores or the like it is necessary that they shall be of reliably uniform high quality. In use one core having a very high hot dielectric and another core with a relatively low hot dielectric will not perform in the same way as two plugs intermediate in value, the breakdown occuring in the poorer plug. Also, if different portions of the same core are of different resistances it will be readily apparent that leakage will occur through the least resistant portion of the core. Also, if the mechanical strength or resistance to heat shock is low along certain lines in the core, it is evident breakage would take place along those lines or planes.

It has been found that the best way so far discovered for producing uniformity in fired products of the kind to which this application relates is to grind the materials to a fine powder, mix them in slip-like consistency, the mixing being continued until the slip is thoroughly uniform, and then spray dry the slip into minute rounded pellets which constitute a readily pourable material. This material may then be poured into a mold cavity and fill that cavity to a substantially uniform density with material of substantially uniform composition. The powder may then be compressed under high hydraulic pressure or the like and the compressed body fired in the usual manner. The result is a product which is highly uniform both as to different articles and as to different portions of the same article.

In the foregoing description whiting has been mentioned as a typical compound of calcium which may be employed in this process. So far as the ultimate composition is concerned, it is evident that lime might be employed, for example, but the presence of lime in slip interferes very markedly with the proper working of the material, and therefore a relatively inert material such as whiting is preferable. In like manner, while magnesia would produce the final composition desired, it interferes with the best working of the material, although not so much as lime. For that reason magnesium carbonate or silicate, or the hydrated mineral brucite is preferable. Dolomite contains a natural combination of magnesium carbonate and calcium carbonate, and may be readily employed for the purposes indicated.

However, the compound of magnesium which is found most effective is powdered soapstone or talc. The silica in talc facilitates the initial softening of the material and seems to be in about the right proportion to secure effective results in lowering the firing temperature without affecting injuriously the finished product. Also it may be readily mixed with the other ingredients to form a slip.

As indicated above, the use of about 2% of talc with 1½% of whiting forms a composition which lowers the firing temperature of alumina very remarkably for the amount of materials added and at the same time increases somewhat the hot dielectric of the most pure alumina readily available and still more markedly increases the hot dielectric with alumina containing greater amounts of sodium compounds or similar impurities.

For the above stated reasons a mixture of talc and whiting is preferred for reducing the firing temperature of the alumina and improving its insulating qualities, but brucite and whiting, or dolomite, or other mixtures of magnesium carbonate and calcium carbonate are very satisfactory.

A good method of preparing the materials is to grind the alumina together with the addition of talc and whiting or the like in a ball mill for twenty-four hours, or until thoroughly ground and mixed. Where sillimanite balls, composed of about one-half silica, are used, as much as four percent of silica may at times be incorporated in the batch from the abrasion of the balls, but still a very satisfactory product results, having the typical good qualities of an alumina body, with especially good hot dielectric properties, and the additional silica may assist in lowering the maturing temperature of the body. About 1.28% silica is added in the suggested 2% of talc. In the appended claims, the amount of silica recited is intended to make allowance for silica acquired during grinding as well as that added in talc or the like.

The addition of whiting is very effective up to an amount which will result in about .7% CaO in the fired body. Amounts resulting in over 1.4% of CaO in the fired body do not increase the good results of this ingredient proportionately. The compound of magnesium is preferably added, to produce the remarkable effect of the combination of the materials, in such an amount as to result in about ⅔ as much MgO as CaO in the body, but may be varied with considerable effectiveness from ⅓ to 1⅓ as much as the CaO.

While some variations have been indicated, it will be readily understood that other modifications may be made within the scope of the appended claims.

What I claim is:

1. Fine-grained, dense, ceramic insulating material consisting of upwards of 90% sintered alumina, from .7% to 1.40% CaO, from ⅓ to 1⅓ times as much MgO as there is CaO, and any remainder consisting chiefly of silica.

2. Insulating material in accordance with claim 1, and the silica constituting not over 5%.

3. A spark plug insulator consisting of a fine-grained, dense, ceramic material consisting of approximately 95% sintered alumina, .85% CaO, .63% MgO, and the remainder silica, except for not over 1% impurities.

4. A spark plug insulator consisting of approximately 96½% sintered alumina, 2% talc, 1½% whiting ground together and fired.

JOSEPH A. JEFFERY.